United States Patent [19]

Young et al.

[11] 3,755,870

[45] Sept. 4, 1973

[54] PRESSURE RETAINING FACE SEAL AND METHOD

[75] Inventors: James L. Young, Guilford; Kurt H. Conley, Hamden, both of Conn.

[73] Assignee: Entoleter, Inc., Hamden, Conn.

[22] Filed: Dec. 20, 1971

[21] Appl. No.: 209,691

[52] U.S. Cl. ... 29/148.4 S, 29/DIG. 19, 29/DIG. 34, 277/56
[51] Int. Cl. .......................... B23p 7/00, B21d 39/00
[58] Field of Search ................... 277/54, 55, 56, 57; 29/156.8 R, 148.4 S, DIG. 19, DIG. 34

[56] References Cited
UNITED STATES PATENTS

| | | | |
|---|---|---|---|
| 3,601,307 | 8/1971 | Shapiro | 277/3 |
| 3,537,713 | 11/1970 | Matthews et al. | 277/55 |
| 2,981,490 | 4/1961 | Conley | 277/72 R X |
| 1,806,515 | 5/1931 | Zoelly | 277/54 |

*Primary Examiner*—Samuel B. Rothberg
*Attorney*—Nelson E. Kimmelman

[57] ABSTRACT

A seal for a rotating shaft comprises a generally annular body fixed to the shaft which has a plurality of concentric circular projections which extend generally parallel to the axis of the shaft. A second, generally annular member made of a heat-resistant yieldable material such as sintered metallic fibers includes a plurality of concentric circular grooves formed therein which mate with the corresponding projections of the first member. The method of making the seal is to bring the annular member having the projections into compressive contact with a generally annular blank of the yieldable material so that the projections form the corresponding mating grooves in the annular blank.

2 Claims, 5 Drawing Figures

Patented Sept. 4, 1973

INVENTORS.
KURT H. CONLEY
JAMES L. YOUNG

BY

Maleson, Kimmelman + Ratner
ATTORNEYS

INVENTORS.
KURT H. CONLEY
JAMES L. YOUNG
BY
Malson, Kimmelman + Ratner
ATTORNEYS

PRESSURE RETAINING FACE SEAL AND METHOD

BACKGROUND OF THE INVENTION

1. Field of the Invention

This invention relates to a shaft seal and in particular to a seal for maintaining a given gas pressure within an enclosed machine into which a shaft is passed.

2. Prior Art

For many years, various seals have been employed around shafts at points where they enter an enclosure. In order to prevent movement of fine solid particles into or out of the machines, seals such as labyrinth seals have been employed together with air purges. In order to provide for static or dynamic off-axis alignment of the shaft, the spacing of the labyrinth seal from the shaft necessarily had to be somewhat larger than was optimal to prevent gas or fine particle travel through it. Thus, where an air purge was used with the seal, much of the air would escape through it, and hence the consumption of air was not as efficient as desired.

So-called "lip-seals" have also been employed wherein a resilient material is pressed into contact with the periphery of the shaft. However, these seals have the following disadvantages: (1) they are not sufficiently heat-resistant at high rotational speeds such as 12,000 RPM, (2) they require lubrication such as grease, and (3) they are subject to wear from abrasive materials within the machine which tend to migrate toward the seals. There has therefore been a need for a wear-resistant seal which can be placed into touching or almost touching contact with a high speed revolving shaft and yet resist the high heat of rotation without requiring lubrication.

BRIEF SUMMARY OF THE INVENTION

A seal for a rotary shaft or the like comprising a first member having one or more projections formed in a relatively hard material and a second member made of a heat-resistant, yieldable material having one or more grooves formed therein adapted to mate with said projections, one of said members being adapted to be fixed to the shaft.

DETAILED DESCRIPTION OF THE DRAWINGS

Figures 1, 4, 5:
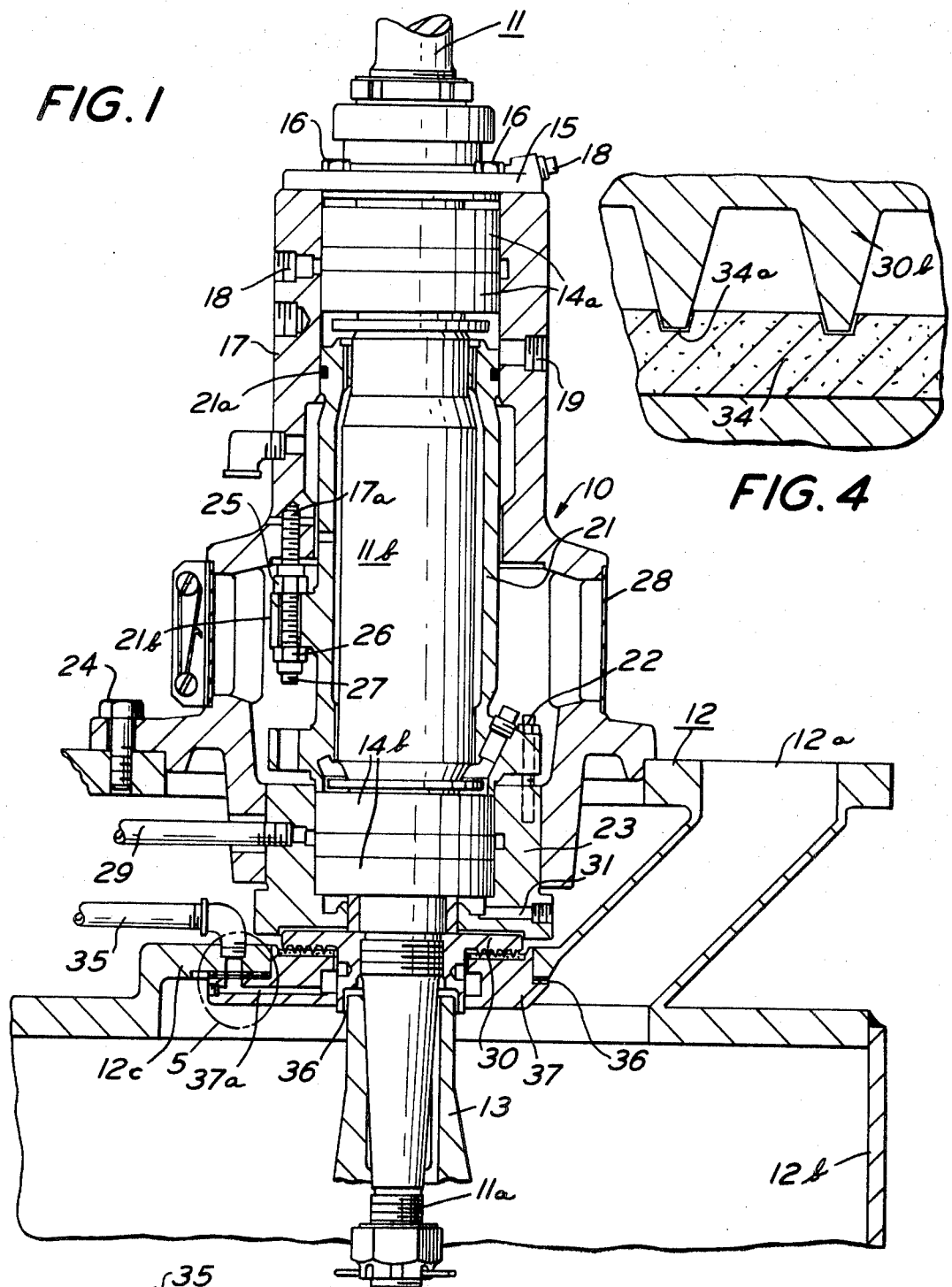
FIG. 1 is a sectional view of an assembly in which the present invention is used.
FIG. 4 is an enlargement of part of the apparatus shown in FIG. 2.
FIG. 5 is an enlarged portion of the apparatus shown in FIG. 1 surrounded by circle 5.

Referring to FIG. 1 there is shown a spindle or shaft assembly indicated generally at the numeral 10 which is fixed to an appropriate supporting structure or housing 12, such as the housing of a centrifugal impact milling machine of the type manufactured by Entoleter, Inc., and depicted in U.S. Pat. No. 3,171,604. The present invention is usable, however, with any other type of apparatus wherein a rotor is rotated at high speed and it is desired to seal the rotor shaft to prevent fluid or minute solid particles from passing into the housing or out of the housing via the rotor shaft.

The assembly 10 includes a unitary shaft or spindle indicated generally at the numeral 11 having a lower end 11a which is attached to any desired rotor such as a rotor for centrifugal impact milling of the type described in the above-mentioned patent. In the case of its use with such a centrifugal impact mill, the housing 12 will include an inlet chute 12a through which the input material is applied to the impacting rotor shown partially at the numeral 13. Below the cylindrical housing wall 12b there will be suspended, for example, a hopper (not shown) as pictured in the above-mentioned patent.

The shaft or spindle 11 is journalled between bearings contained within upper and lower bearing blocks or boxes 14a and 14b respectively. The shaft passes through an opening in member 15 which is fixed by bolts 16 to the supporting structure indicated generally at 17. The latter is fixed by bolts 24 (FIG. 1) or any other fastening method to the housing 12 on which its lower edge rests. The member may include a labyrinth seal (not shown) and a lubrication input channel closed by a plug 18. Inwardly of the plug 18 there is a lubrication passageway that communicates with the races of the bearings in the bearing block 14a. Lubrication is removed from the bearings via lubrication outlet opening 19.

Immediately surrounding the intermediate portion 11b of the shaft is a sleeve 21 having a smaller diameter upper portion that encircles the shaft 11 and supports it. Sleeve 21 includes a gasket or seal 21a that bears against the inner wall of the supporting member 17 and slides when the shaft 11 and the sleeve 21 are moved vertically as will be explained below. The sleeve is bolted by bolts 22 to the lower bearing block housing 23. Sleeve 21, the bearing block 14a, the spindle 11, which is supported on lower bearing block 14b, and the lower bearing block housing 23 and any other member such as the member 30 fixed to the spindle may be moved upward or downward a small distance by turning the adjusting nuts 25 and 26 located on a projection 21b of the sleeve. A vertical hole is formed in projection 21b through which a threaded vertical stud 27 passes. The upper end of the stud is screwed into an aligned threaded aperture 17a in the supporting structure 17. There is a removable cylindrical wall 28 which surrounds the generally annular space in which the stud 27 and the adjusting nuts 25 and 26 are located.

The lower housing 23 is equipped with a lubrication inlet pipe 29 which applies lubrication to the bearings within bearing block 14b. Spent lubrication is withdrawn via lubrication outlet 31 to the exterior of the apparatus.

Figure 2:
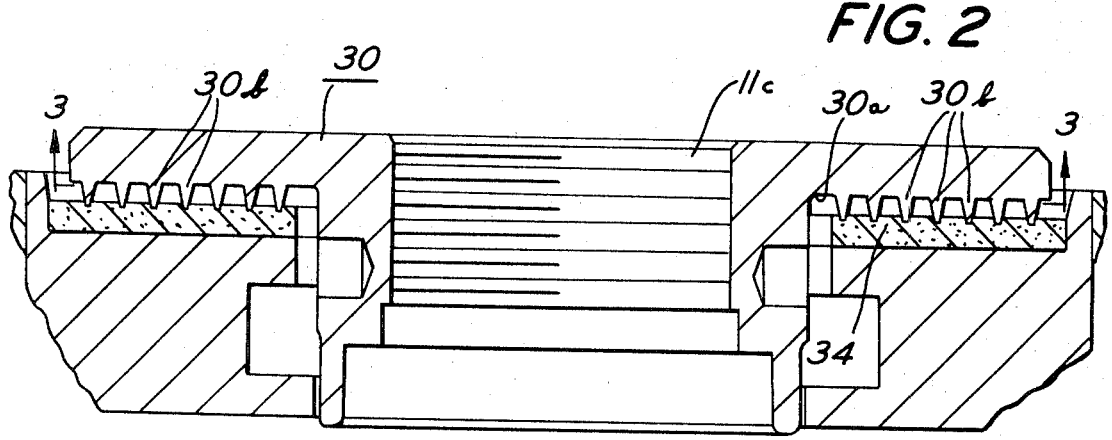
FIG. 2 is a fragmentary enlarged view of a portion of the apparatus shown in FIG. 1.
Figure 3:
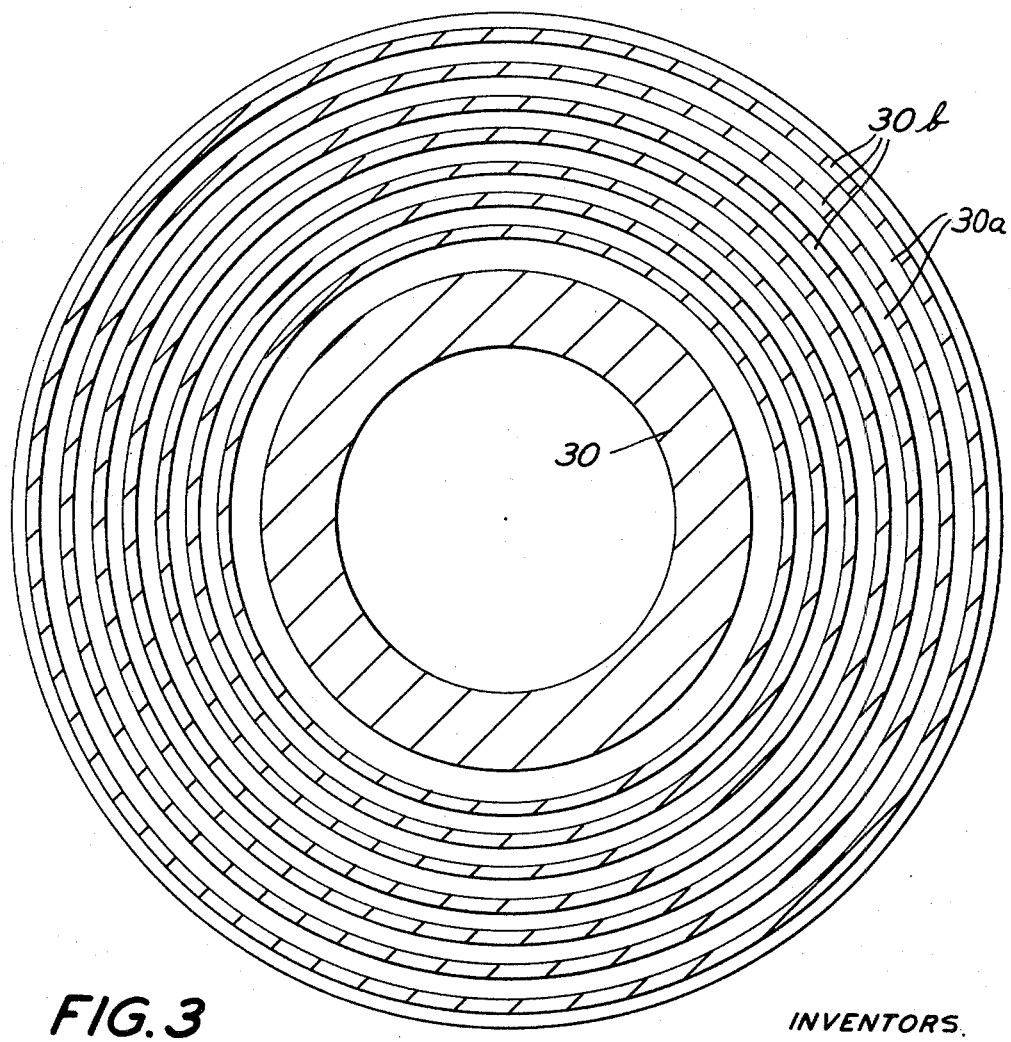
FIG. 3 is a sectional view taken along the section line 3—3 in FIG. 2.

It is often desirable to isolate the pressure within the housing 12 from the pressure without. In accordance with the present invention, there is a horizontally disposed member 30 which is screwed onto the lower threaded portion 11c of the shaft and revolves in unison therewith. Protruding downwardly from the lower surface 30a of the member 30 are a series of concentric ridges 30b. As shown in FIGS. 2 and 4, the circular ridges have somewhat flat-ended tips 30c. Just below the ridges there is a generally annular body 34 made of a yieldable material such as "Feltmetal" marketed by the Huyck Metals Company of Milford, Connecticut. This material consists of a great number of randomly interlocked metallic fibers which have been sintered wherever the fibers touch each other. This material is heat-resistant and when it is subjected to compression, for instance, it will retain its compressed form. The member 37 has an upper recessed portion whose contours match those of the body 34 so that the body 34 fits snugly within the recess. The member 37 is itself fixed by bolts 39 (FIG. 5) or by any other appropriate fastening means to the underside of the central portion 12c of the housing 12.

If desired, air may be pumped in through pipe 35 into the passageway 37a formed in member 37 which then follows a split path. Part may pass downward into the mill into the space between the periphery of the lower portion of the member 30 and, to a somewhat more limited extent, part flows upward and outward through the spaces between the tips 30c and the corresponding grooves 34a formed in the compressible body 34. This air acts as a final purge to prevent solid particles from going into the mill from the outside of vice-versa. It also, naturally, prevents flow of gas (other than the pumped air) inwardly to the mill or outwardly from the mill past the face seal.

In practice, the grooves formed in the body 34 are formed by unscrewing nut 26 so that the projection 21b and the entire sleeve 21 moves down thereby letting the spindle 11 move down perhaps as much as one or two sixteenths of an inch. Since the spindle 11 moves down, so does the member 30 since it is screwed onto the shaft 11. The weight of the spindle, the sleeve 21, the bearing blocks 14a and 14b and the rotor attached to the spindle will cause the annular ridges 30b to compress corresponding grooves 34a into the upper horizontal portion of the compressible body 34. When the power is applied to the spindle and it rotates, the lower edges 30c of the annular ridges will wear into the grooves 34a and the ridges and grooves will mate perfectly except for minute clearances between the edges 30c and the troughs of the grooves 34a.

Although the shaft 11 may be rotated at a very high speed, there is no necessity for applying grease or other lubricant to the interface between the two portions 30 and 34 of the novel face seal since body 34 is heat resistant even if the ridges 30b and the body 34 make contact with one another. By having the mating step formed in place any eccentricities of spindle alignment or wobble will form distinctive corresponding impressions in the body 34. In certain applications, it may be desirable to reverse the relative positions of the members 30 and 34. Thus, the annular, grooved member 34 may be fashioned to rotate with the shaft whereas the ridged member 30 may be fixed to housing 12 or other appropriate mounting medium.

While the invention has been shown in a machine wherein there is an adjusting stud 27 connected to the outer supporting structure and passing through an aperture in the sleeve 21, it is equally applicable to a non-adjustable spindle assembly. In such case, the spindle may be supported by an appropriate bearings or other structure in a vertically fixed position. The plurality of shims 36 are then inserted between the member 37 and the portion 12c of the housing as shown in FIG. 1.

When the bolt 39 is tightened, the ridges 30b will be impressed into the body 34 to a certain extent. If it is desired to increase the depths of the grooves 34a, one or more of the shims may be removed by unscrewing bolts 39 thereby allowing member 37 to be detached.

For various reaons, the clearances between the ridges 30b and the grooves 34a may, in time, become larger than desired. Ridges 30b and the grooves 34a may be brought closer if this happens. In the case of the adjustable spindle assembly, adjustment of the nut 26 will accomplish this purpose. In the case of the non-adjustable spindle, removal of one or more of the shims 36 allows the ridges to form deeper grooves for a better seal.

It should be understood that, while the invention has been explained in terms of the sealing of the rotor shaft with respect to air, the invention is equally applicable to cases where any other gas is to be used within the processing chamber, e.g., inert nitrogen, Freon, etc. In such cases, of course, the inlets 12a and the discharge junction of the hopper attached to the housing wall 12b should be gas-tight. Any appropriate known technology for insuring the tightness of the junctions and seals may be employed toward this end.

The invention has been explained in terms of shafts which are positioned vertically. Of course, it is equally applicable to any other applications regardless of the angular orientation of the shaft.

Still other forms of the invention which do not depart from the essence thereof will occur to those skilled in the art upon reading this specification and peruseing the drawings herein. Consequently, our invention should be limited soley by the claims as follows:

We claim:

1. A method of making a seal for an elongated rotating member comprising;
   a. providing a first substantially annular, disc-like horizontal member having at least one generally circular projection formed on one face thereof, said projection being made of a relatively hard material,
   b. providing a second generally annular, disc-like horizontal member made of a heat-resistant yieldable material, at least one of said first and second members being fixed to said elongated member and extending substantially transverse to the axis thereof for rotation therewith, both of said members being disposed substantially parallel to one another,
   c. causing said first and second members to move axially and thereby come together with sufficient force to enable said projections to form corresponding mating grooves in said second member, and
   d. rotating said elongated member while said first and second members are in contact with one another.

2. The method according to claim 1 wherein said first member is metallic and fixed to said elongated member and has a plurality of concentric circular projections formed therein, and wherein said second member is made of sintered metallic fibers.

* * * * *